J. F. STEWARD.
MOTOR HARVESTER.
APPLICATION FILED AUG. 11, 1913.
1,090,246.
Patented Mar. 17, 1914.
2 SHEETS—SHEET 1.
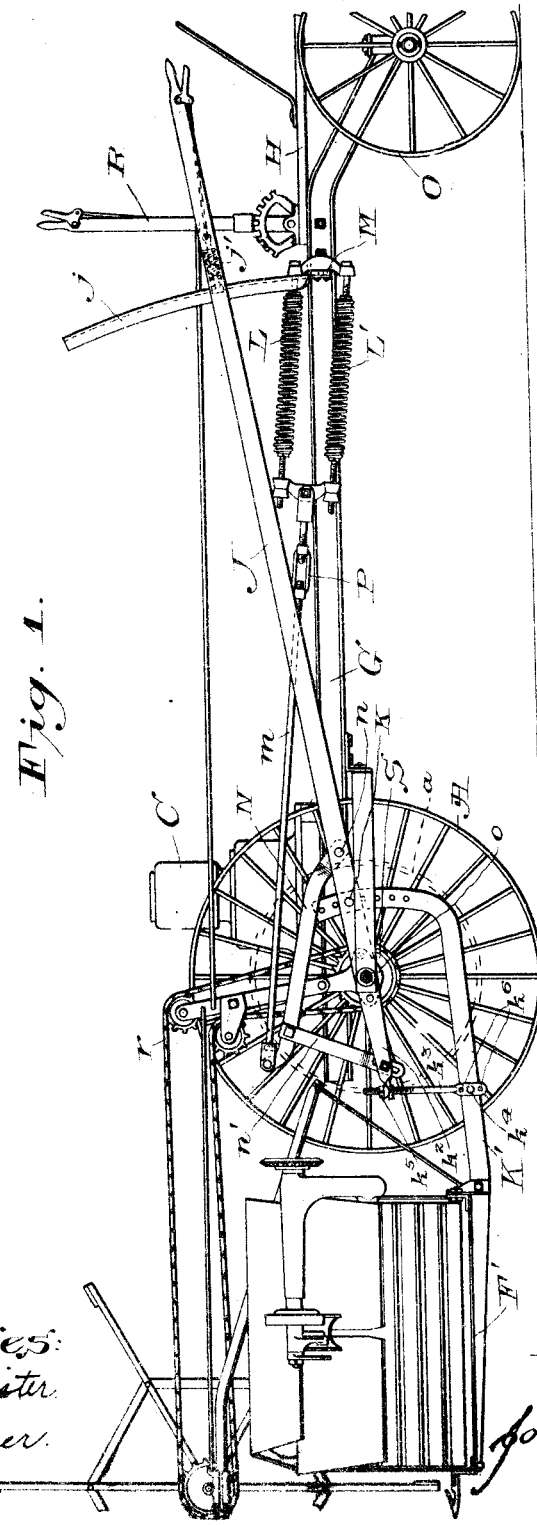
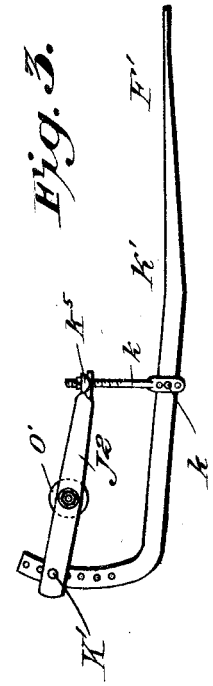

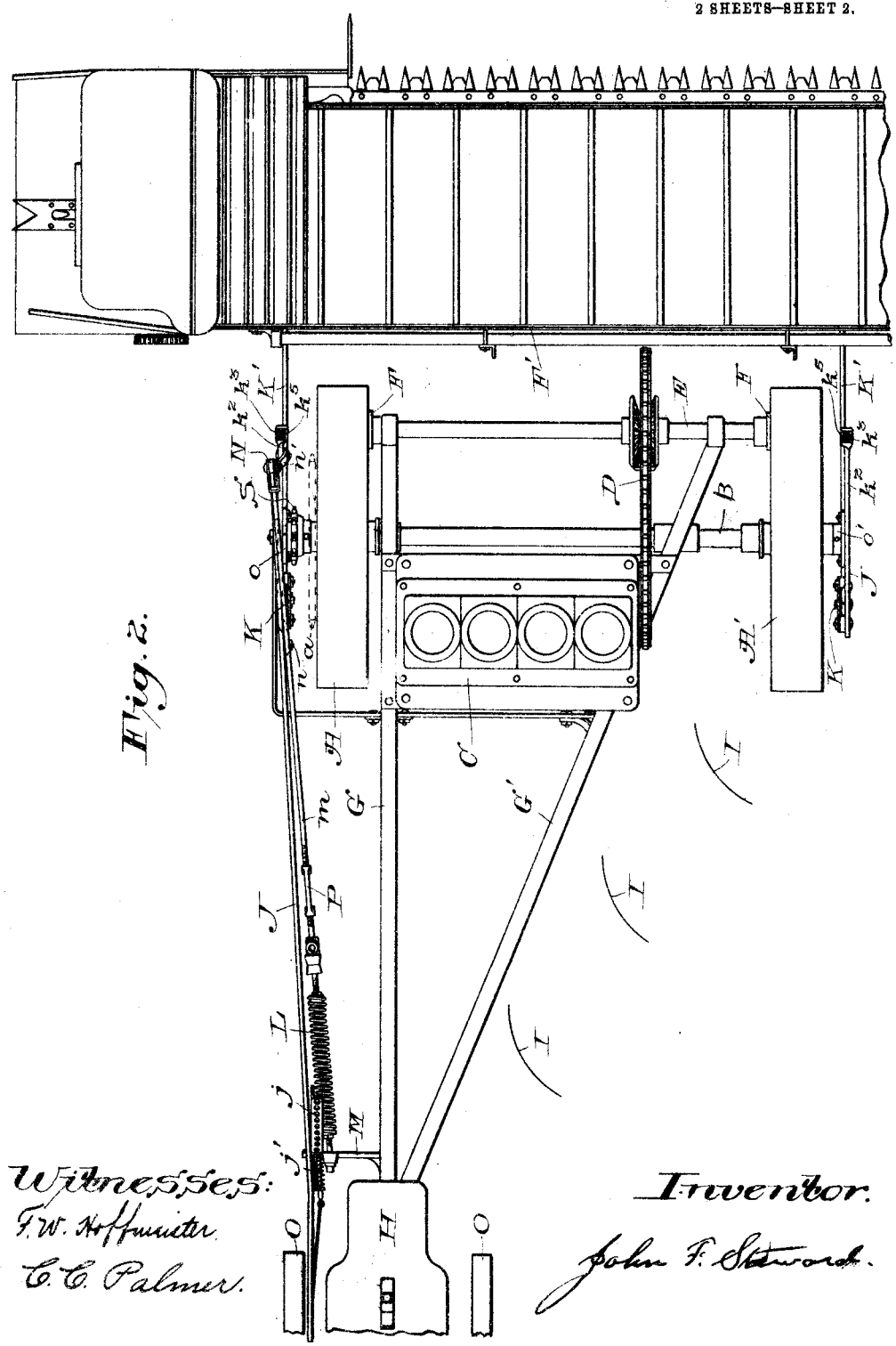

UNITED STATES PATENT OFFICE.

JOHN F. STEWARD, OF CHICAGO, ILLINOIS.

MOTOR-HARVESTER.

1,090,246.  Specification of Letters Patent.  Patented Mar. 17, 1914.

Application filed August 11, 1913. Serial No. 784,062.

*To all whom it may concern:*

Be it known that I, JOHN F. STEWARD, a citizen of the United States, residing at Chicago, in the county of Cook and State of Illinois, have invented certain new and useful Improvements in Motor-Harvesters, of which the following is a full description, reference being had to the accompanying drawings, in which—

Figure 1 is a stubbleside elevation of my harvesting machine; and Fig. 2 a plan view of such parts of the machine as necessary to show. Fig. 3 is a side elevation of the grain-side devices for sustaining the harvesting mechanism.

The invention consists in the adoption of means whereby harvesting devices may be applied to a plowing tractor, and its object is to so arrange that the attachment may be easily applied or taken away.

A and $A^1$ may be considered the supporting wheels of a plowing tractor, and B the axle thereof.

C may be any engine suitably geared to the traction wheels by chain or any suitable means.

D is the usual differential, E the intermediate shaft, and F suitable pinions adapted to mesh with gearing upon the supporting wheels.

G and $G^1$ constitute the main portion of the frame, and H represents the operator's platform suitably supported on steering wheels O, O.

The position of the plows is shown by the curved lines I, I, which may be suitably attached to the axle in order that they may be properly drawn. As the invention is applicable to any tractor having a non-rotatable axle, as B, but little descriptive detail is required.

At the stubble end of the axle, and secured fixedly thereto, is the lever J, the axle forming its fulcrum, and its longer arm extending to a position within reach of the operator when on his stand H. A quadrant $j$ and suitable latch $j^1$ on the lever maintain the latter in any position to which it is adjusted. Secured to the lever at K is a line lever $K^1$, which is also suspended from the short arm $k^2$ of the lever J by means of the link $k^3$, suitably connected to the short arm of the lever at $k^4$. The link $k^3$ is threaded and provided with an adjustment nut $k^5$, and holes $k^6$ are provided at its lower end in order that the line levers $K^1$ may be set relative to the lever J, the thread and nut adjustment $k^5$ being provided for finer adjustments.

The parts mentioned are duplicated on the grain side of the machine except that the lever, the equivalent of the arm $k^2$ of the lever J, extends rearward no farther than necessary to secure it to the line lever by a duplicate of the bolt K. The parts referred to being secured positively to the axle by means of the hub $o^1$, a duplicate of the hub $o$, to which the lever J is secured, not only the axle is rocked, but the line lever $K^1$ is moved. This true, the parts shown at the grain end of the machine are also rocked. The body of the harvester binder $F^1$ being supported upon the line lever, it is clear that the rocking of the axle will raise and lower the cutting apparatus.

In order to counterpoise the weight of the harvesting mechanism, one or more springs, as L and $L^1$, are provided, the rear end secured to the main frame by outreaching arms M, or other suitable means.

$m$ is a rod suitably connected to the springs and extending forward to an arm N secured to and upreaching from the lever. This arm is not only itself secured to the lever J by the bolt $n$, but is braced thereto by the strut $n^1$. The usual adjustments for increasing or decreasing the tension of the springs are provided by the turn-buckle P.

To the stubbleside traction wheel A is secured the sprocket wheel $a$, or other suitable gearing for transmitting motion to the operative parts of the harvesting attachment, not necessary to here show. The reel is controlled by suitable levers, as R, and the reel is given rotation by suitable chains $r$, thrown around sprocket wheels, as S, secured to the hub of the wheel A, serving to give motion to the reel.

It is thus seen that all parts of the harvesting attachment are secured to the axle outside of the supporting wheels A and $A^1$. By this means of securement it becomes an easy matter to attach and detach the harvesting mechanism by merely removing the parts secured to the ends of the axle. The chains and surplus levers can be easily taken away.

I am aware that it is old to secure all parts provided for varying the height of cut to a rocking axle, but believe my specific combination and arrangement of elements to be new, as claimed.

What I claim as my invention, and desire to secure by Letters Patent, is:

1. In a motor harvesting machine, in combination, a motor sustained upon a suitable framework, and the latter sustained upon traction wheels and an axle capable of being oscillated, the motor geared to the traction wheels and to the operative parts of the harvesting mechanism, said axle extending through both traction wheels and having secured to its ends, outside of the traction wheels, arms for supporting the harvesting mechanism, a lever, as J, secured to the end of said axle for the purpose of affecting the height of cut of the harvesting mechanism, and means for securing said lever in any position of adjustment.

2. In a motor harvesting machine, in combination, a motor suitably sustained upon traction wheels and an axle capable of being oscillated, the motor geared to the traction wheels and to the operative parts of said harvesting mechanism, the axle extending through both traction wheels and having secured to its ends, outside of the traction wheels, arms for the support of the harvesting mechanism, a lever, as J, secured to one end of said axle outside of one of the traction wheels, one of the supporting arms for the harvesting mechanism secured to said lever.

3. In a motor harvesting machine, in combination, a motor suitably sustained upon traction wheels and an axle capable of being oscillated, the motor geared to the traction wheels and to the operative parts of said harvesting mechanism, the axle extending through both traction wheels and having secured to its ends, outside of the traction wheels, arms for the support of the harvesting mechanism, and a lever, as J, one of the supporting arms for the harvesting mechanism adjustably secured to said lever.

4. In a motor harvesting machine, in combination, a motor suitably sustained upon traction wheels and an axle capable of being oscillated, said motor geared to the traction wheels and to the operative parts of the harvesting mechanism, the axle extending through both traction wheels and having secured to its ends, outside of the traction wheels, levers to which the arms that sustain the harvesting mechanism are secured.

5. In a motor harvesting machine, in combination, a motor suitably sustained upon traction wheels and an axle capable of being oscillated, said motor geared to the traction wheels and to the operative parts of the harvesting mechanism, the axle extending through both traction wheels and having secured to its ends, outside of the traction wheels, a lever to which the arm that sustains the grain end of the harvesting mechanism is adjustably secured.

6. In a motor harvesting machine, in combination, a motor suitably sustained upon traction wheels and an axle capable of being oscillated, said motor geared to the traction wheels and to the operative parts of the harvesting mechanism, the axle extending through both traction wheels and having secured to its ends, outside of the traction wheels, levers to which the arms that sustain the harvesting mechanism are adjustably secured, one of said levers serving as means to oscillate the axle and thus affect the height of cut of the harvesting mechanism.

7. In a motor harvesting machine, in combination, a motor suitably sustained upon traction wheels having an axle capable of being oscillated, said motor geared to the traction wheels and to the operative parts of the harvesting mechanism, the axle extending through both traction wheels and having secured to its ends, outside of the traction wheels, arms for supporting the harvesting mechanism, and a counterpoising spring secured to an arm extending from said axle and to a fixed part of the motor frame.

JOHN F. STEWARD.

Witnesses:
Jas. G. Christie,
J. G. Elder.